United States Patent [19]
Iwasaki

[11] Patent Number: 5,825,484
[45] Date of Patent: Oct. 20, 1998

[54] OPTICAL SPECTRUM MEASURING DEVICE

[75] Inventor: Takashi Iwasaki, Tokyo, Japan

[73] Assignee: Ando Electric Co., Ltd., Tokyo, Japan

[21] Appl. No.: 839,945

[22] Filed: Apr. 24, 1997

[30] Foreign Application Priority Data

Apr. 30, 1996 [JP] Japan .................................. 8-109604

[51] Int. Cl.[6] ...................................................... G01J 3/00
[52] U.S. Cl. .................. 356/300; 356/326; 250/214 AG
[58] Field of Search ..................................... 356/326, 328, 356/325, 330–334, 300, 319–329, 226, 250; 250/207, 214 AG

[56] References Cited

U.S. PATENT DOCUMENTS 4,669,877  6/1987  Wittmer .............................. 250/207 X Primary Examiner—K. Hantis
Attorney, Agent, or Firm—Finnegan, Henderson, Farabow, Garrett & Dunner, L.L.P.

[57] ABSTRACT

The present invention has the object of preventing saturation of an optical detector by applying an inverted bias voltage so as to allow accurate measurement of optical spectra. In order to achieve this object, the present invention provides voltage applying means 8 controlled by a control section 6 for applying an inverted bias voltage to the optical detector 3 in order to prevent saturation of the optical detector 3.

3 Claims, 7 Drawing Sheets

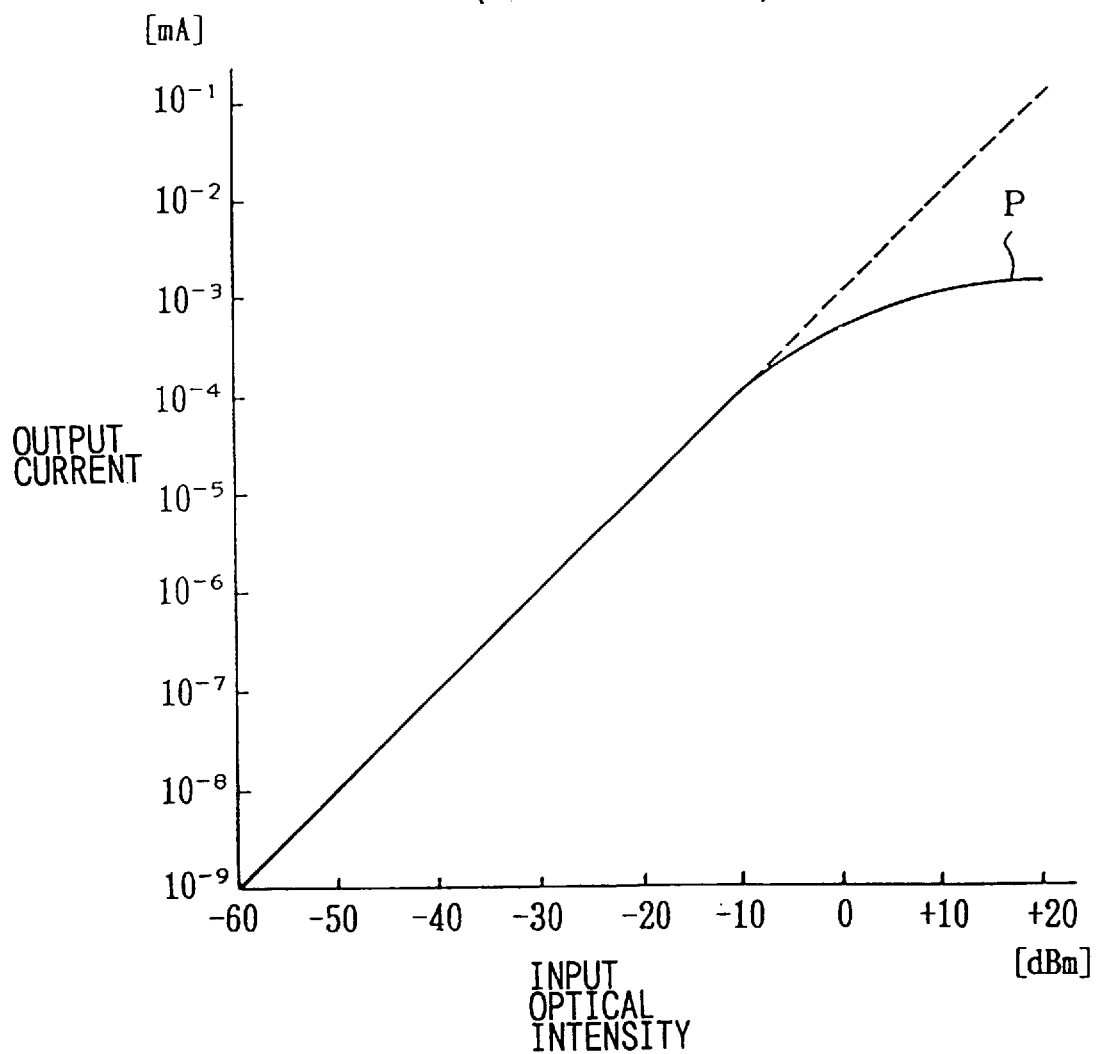

OPTICAL SPECTRUM MEASURING DEVICE

BACKGROUND OF THE INVENTION

1. Technical Field of the Invention

The present invention relates to an optical spectrum measuring device for measuring the spectral properties of light emitted from a light source.

2. Background Art

FIG. 4 is a block connection diagram showing a conventional optical spectrum measuring device. In the drawing, reference numeral 1 denotes a light source, reference numeral 2 denotes a spectroscope for selectively extracting light of a specific wavelength component from the beam emitted from the light source 1, and reference numeral 3 denotes an optical detector for receiving a beam of a specific wavelength component obtained from the spectroscope 2 and outputting an electrical signal corresponding to the optical intensity of this beam, for which a photodiode can be used as is conventional.

Reference numeral 4 denotes an amplifier circuit for amplifying the signal outputted by the optical detector 3 to a voltage suitable for inputting to an analog-to-digital converter, and reference numeral 5 denotes an analog-to-digital converter (hereinafter referred to as an A/D converter) for converting the output signal of the amplifier circuit into a digital signal.

Reference numeral 6 denotes a control section for variably controlling the wavelength passed by the spectroscope 2, determining the wavelength-optical intensity characteristics from the optical intensity signals obtained from the A/D converter 5, and controlling the amplification factor of the amplifier circuit 4 so as to compensate for reductions in the optical intensity of the passed wavelengths.

Reference numeral 7 denotes a display section which displays the wavelength-optical intensity characteristics obtained by sweeping the wavelengths passed by the spectroscope 2 under control of the control portion 6 in the form of an optical spectrum.

The operation of the conventional optical spectrum measuring device of FIG. 4 is explained below. First, an output beam 1A from the light source 1 is inputted to the spectroscope 2, and the spectroscope 2 extracts an output beam 2A of a specific wavelength component from the output beam 1A and sends this output beam 2A to the optical detector 3.

The optical detector 3 receives this output beam 2A and converts it into an electrical signal proportional to the optical intensity thereof. This electrical signal is amplified by an amplifier circuit 4 to a voltage appropriate for inputting to an A/D converter 5. The A/D converter 5 converts the output of the amplifier circuit into a digital signal which is suitable for the control process described below.

On the other hand, the control section 6 controls the rotation of a diffraction grating in the spectroscope 2 so as to vary the wavelength passed thereby, converts the signals corresponding to the optical intensities of the output beams 2A into digital signals by means of the A/D converter 5, reads these while sweeping the wavelengths in order to determine the wavelength-optical intensity characteristics, and displays these at the display section 7 in the form of an optical spectrum.

Additionally, the control section 6 controls the amplification factor of the amplifier circuit 4 so as to compensate for decreases in the optical intensities which depend on the passed wavelengths.

FIG. 5 is a schematic drawing showing the internal structure of the above-mentioned spectroscope 2 which is known as a Czerny-Turner spectroscope. In the drawing, reference numeral 21 donates an an entry slit plate having a vertically long slit 21a and reference numeral 22 denotes a concave mirror for reflecting and converting the light passing through the slit 21a into a parallel beam.

Reference numeral 23 denotes a diffraction grating which receives the parallel beam and reflects and outputs only the diffracted light of a specific wavelength component which is determined by the angle of rotation. This diffraction grating 23 is provided with a plurality of grooves in the vertical direction, and is capable of rotating over a predetermined angle about an axis parallel to these grooves by means of a rotary mechanism such as a motor.

Reference numeral 24 denotes a concave mirror which receives the light diffracted from the diffraction grating 23 and reflects it to the exit slit plate 25 for imaging. This exit slit plate 25 passes only the wavelength components within the range of the width of the vertically long slit 25a provided therein, and outputs this as the output beam 2A of the spectroscope 2.

With the spectroscope 2 of this structure, after the output beam 1A from the light source 1 hits the entry slit plate 21, only the light passed by the slit 21a is incident on the concave mirror 22 for conversion to a parallel beam.

Then, this parallel beam is incident on the diffraction grating 23, where only diffracted light of a specific wavelength component determined by the angle of the diffraction grating 23 which is made variable by means of the rotary mechanism 23A is reflected and inputted to the concave mirror 24. As a result, the concave mirror 24 images the diffracted light onto the exit slit plate 25.

Only light of wavelength components corresponding to the width of the slit 25a in the exit slit plate 25 passes through the slit 25a as the output beam 2A of the spectroscope 2.

The wavelength-transmissivity properties of the spectroscope 2 are such that the transmissivity of the spectroscope changes depending on the passed wavelengths as shown in FIG. 6, wherein the horizontal axis represents the passed wavelength of the spectroscope 2 and the vertical axis represents the transmissivity of the passed wavelength. This is due to the fact that the reflectivity of the diffraction grating changes depending on the wavelength. For example, at a measured wavelength of 400 nm, the transmissivity attenuates to less than 10%, and this causes the output beam 2A to attenuate to less than 10% if the measured wavelength of the light source 1 is 400 nm. Therefore, the measured optical intensity must be corrected.

Thus, since the spectroscope has the properties shown in FIG. 6, the optical spectrum measuring device of FIG. 4 employs the means described below for resolving this problem. That is, the transmissivity of each wavelength of the spectroscope 2 is pre-stored in the control section 6. Then, when the light is measured, the measured value for the optical intensity of each wavelength is displayed at the display section 7 after applying a correction procedure based on the stored transmissivity mentioned above.

Additionally, since the optical intensity of the output beam 2A markedly decreases depending on the measured wavelength, there are cases wherein the output voltage of the amplifier circuit 4 is not within the range of voltages which are suitable for input to the A/D converter 5. Therefore, the control section 6 functions so as to appropriately control the amplification factor of the amplifier circuit 4.

As this method for controlling the amplification factor, a first method wherein the amplification factor of the amplifier circuit 4 is set for each predetermined wavelength point may be considered. That is, in this first method, the optical intensity is first measured at the A/D converter 5 according to the wavelength, and the control section 6 judges whether or not this measured value is within a suitable range.

If the measured value is judged not to be within the suitable range, the amplification factor of the amplifier circuit 4 is corrected so that the value will fall within the suitable range. Thereafter, the passed optical intensity at the A/D converter 5 is measured by a conventional procedure as described above, and this procedure is performed with respect to all measured wavelength points.

According to this first method, an appropriate amplification factor can be set for the amplifier circuit 4 with respect to all measured wavelength points, so that the range of measurable optical intensities is broadened.

However, since the rotational angle of the diffraction grating 23 must be stopped at each wavelength point, a lot of time is required for the measurements when the measured wavelength band is broadened. In actual practice, for example, the required measurement time is approximately 10 seconds in the measured wavelength band shown in FIG. 6.

On the other hand, as a method for shortening the measurement time, there is a second method wherein the amplification factor of the amplifier circuit 4 is held constant. With this second method, the optical intensity range to be measured is predetermined. Next, the amplification factor of the amplifier circuit 4 is set prior to the measurements such that the voltage inputted to the A/D converter 5 for the maximum optical intensity value is the upper limit of the suitable range.

In this case, since the transmissivity of the spectroscope 2 varies according to the wavelength, the amplification factor is set to be appropriate for the wavelength within the measured wavelength range at which the transmissivity is maximum.

According to this second method, there is no need to judge whether or not the output of the A/D converter 5 is within a suitable range for each wavelength point, and the amplification factor of the amplifier circuit 4 is not changed during measurement. Consequently, it offers the advantage that measurements can be taken while rotating the diffraction grating 23 at a constant speed and the measurement time can be shortened in comparison to the above-mentioned first method.

However, in this optical spectrum measuring device, a photodiode such as described above is used as the optical detector 3 for converting the output beam from the spectroscope 2 into an electrical signal. The relationship of the output electrical current with respect to the input optical intensity of this photodiode changes according to the characteristic curve P shown in FIG. 7, the output current will saturate if the intensity of the input beam exceeds a standard level, as a result of which the measurements of the optical intensity of the optical spectrum will not be correct.

On the other hand, when the amplification factor of the amplification circuit 4 is held constant as explained above, the transmissivity of the spectroscope 2 will vary according to the wavelength, so that while there are no problems at certain wavelengths, the photodiode will saturate at other wavelengths so as not to allow the optical intensities of the optical spectrum to be correctly measured.

SUMMARY OF THE INVENTION

The present invention has been made to resolve the above-mentioned problems, and has the object of offering an optical spectrum measuring device which can achieve optical spectrum measurements with high reliability by making it possible to prevent optical detectors from outputting erroneous signals due to saturation when the intensity of the input beam to the optical detector is large or the transmissivity of the spectroscope changes.

In order to realize this object, the optical spectrum measuring device according to the present invention is provided with voltage applying means for applying an inverted bias voltage to the optical detector. The application of the inverted bias voltage prevents saturation of the optical detector and thereby allows the optical intensities of the optical spectrum to be correctly measured.

Additionally, the optical spectrum measuring device of the present invention has a control section which applies the inverted bias voltage to the optical detector by the voltage applying means when an output value from the optical detector exceeds a pre-stored maximum output value of non-saturation of the optical detector.

Additionally, in the optical spectrum measuring device of the present invention, the control section determines the wavelength range over which the output values of the optical detector exceed a pre-stored maximum output value of non-saturation of the optical detector when the maximum value of the measured optical intensity range has been measured, and applies the inverted bias voltage to the optical detector by the voltage applying means when taking measurements in this wavelength range.

As mentioned above, the present invention is provided with voltage applying means for applying an inverted bias voltage to the optical detector under control of the control section in order to prevent saturation of the optical detector. The application of the inverted bias voltage prevents saturation of the optical detector and thereby allows the optical spectrum of the output beam from a light source to be correctly measured.

Additionally, since the present invention has a control section which applies the inverted bias voltage to the optical detector by the voltage applying means when an output value from the optical detector exceeds a pre-stored maximum output value of non-saturation of the optical detector, the optical spectrum can be correctly measured without degrading the measurement sensitivity, even if the intensity of the input beam to the optical detector is high.

Additionally, in the present invention, the control section determines the wavelength range over which the output values of the optical detector exceed a pre-stored maximum output value of non-saturation of the optical detector when the maximum value of the measured optical intensity range has been measured, and applies the inverted bias voltage to the optical detector by the voltage applying means when taking measurements in this wavelength range, so that the optical spectrum can be accurately measured in a short measurement time without degrading the sensitivity in wavelength intervals in which there is no possibility of the output electrical current of the optical detector exceeding the maximum output electrical current.

BRIEF EXPLANATION OF THE DRAWINGS

FIG. 7 is a graph showing the optical intensity-output electrical current characteristics of the optical detector shown in FIG. 4.

PREFERRED EMBODIMENTS OF THE INVENTION

Figure 1:
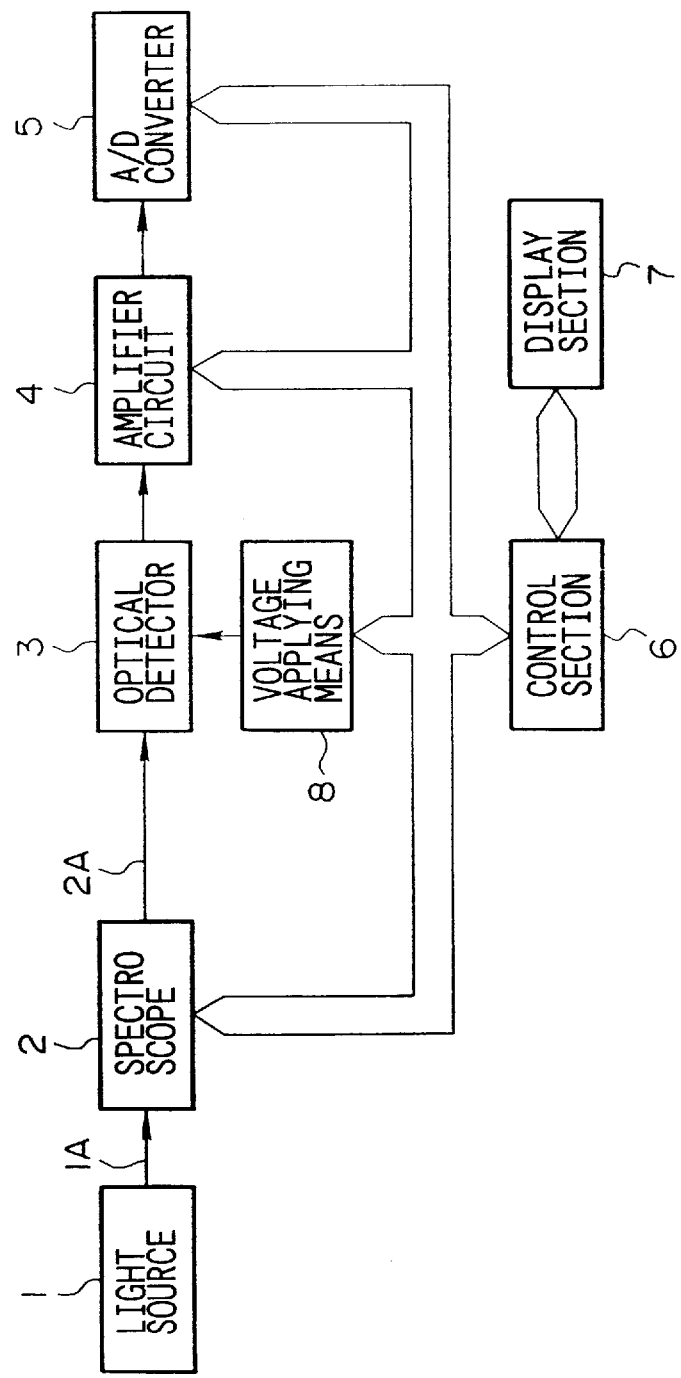
FIG. 1 is a block connection diagram showing an optical spectrum measuring device according to an embodiment of the present invention.

Hereinbelow, an embodiment of the present invention will be explained. FIG. 1 is a block connection diagram showing the optical spectrum measuring device of the present invention, wherein reference numeral 1 denotes a light source, reference numeral 2 denotes a spectroscope, reference numeral 3 denotes an optical detector, reference numeral 4 denotes an amplifier circuit, reference numeral 5 denotes an A/D converter, and reference numeral 7 denotes a display section 7. These elements have basically the same function as those shown in FIG. 5, so the recurring explanations will be omitted.

Reference numeral 8 denotes a voltage applying means connected to the optical detector 3, which applies an inverse bias voltage to the optical detector 3 under control of the above-mentioned control section 6.

Figure 2:
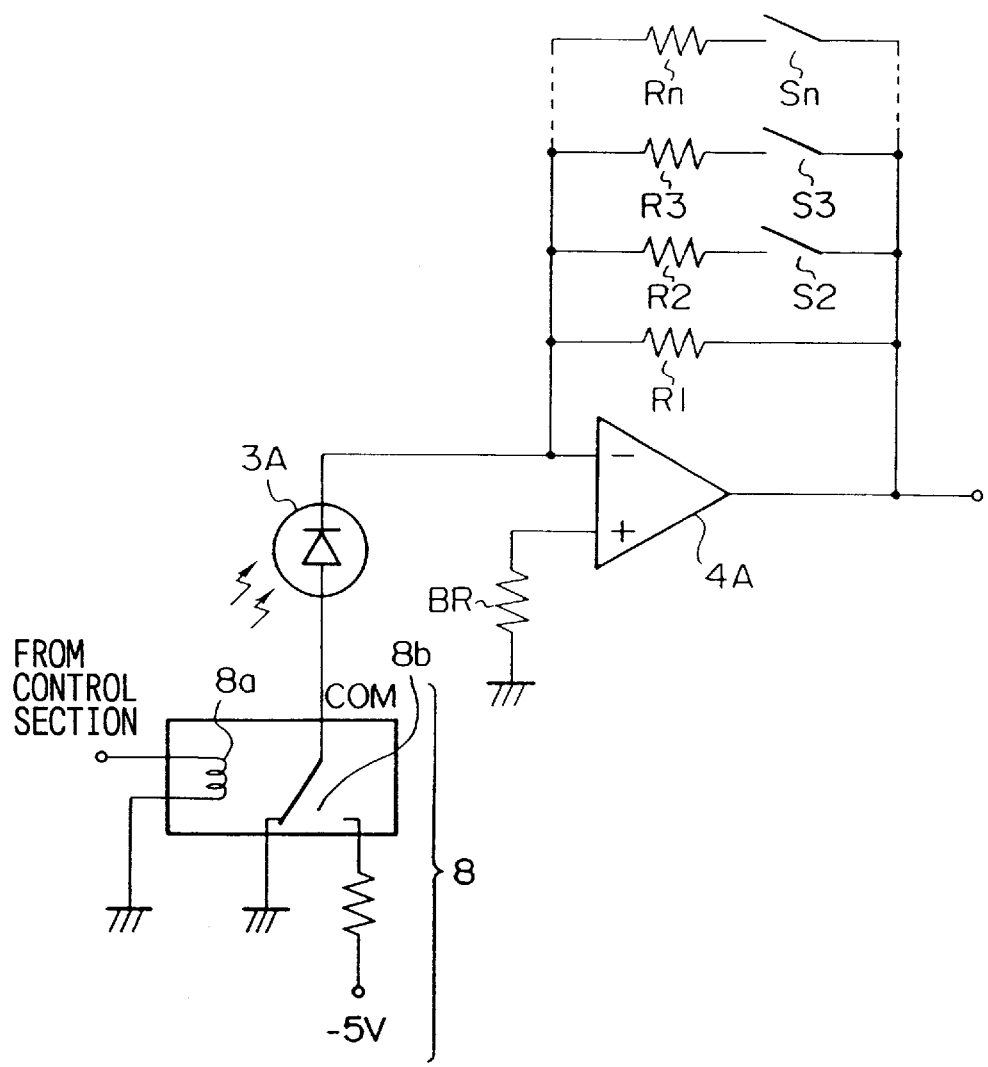
FIG. 2 is a circuit diagram showing the detailed structure of the optical detector, voltage applying means and amplifier circuit shown in FIG. 1.

FIG. 2 is a detailed circuit diagram including the voltage applying means 8, a photodiode 3A corresponding to the optical detector 3, and an op-amp 4A corresponding to the amplifier circuit 4.

The voltage applying means 8 has a relay coil 8a which is biased upon receiving a control signal from the control section 6, and a relay switch 8b which grounds the anode of the photodiode 3A when the relay coil 8a is not biased and switches the anode of the photodiode 3A to a negative potential of −5 V when the relay coil 8a is biased.

The op-amp 4A has the positive input terminal (non-inverted input terminal) grounded via a positive bias resistance BR, while the resistances R1, R2, . . . , Rn which determine the amplification factor of this op-amp 4A are connected across the negative input terminal (inverted input terminal) and the output terminal by means of the amplification factor selection switches S2, S3, . . . , Sn.

In the voltage applying means 8 of this structure, the relay coil 8a is in an unbiased state when no control signals are inputted from the control section 6, so that the relay switch 8b is connected to the ground side and the electrical potential difference between the ends of the photodiode 3A becomes zero. The output electrical current is converted to a voltage at the op-amp 4A and inputted to the A/D converter 5.

On the other hand, when the photodiode 3A is saturated, the relay coil 8a is biased due to the input of a control signal from the control section 6, and the relay switch 8b is switched over to the −5 V terminal.

As a result, the anode of the photodiode 3A is pulled toward the −5 V potential to go into a state of inverted bias. In this case also, an inverted signal roughly proportional to the output electrical current of the photodiode 3A is outputted from the op-amp 4A.

Figure 5:
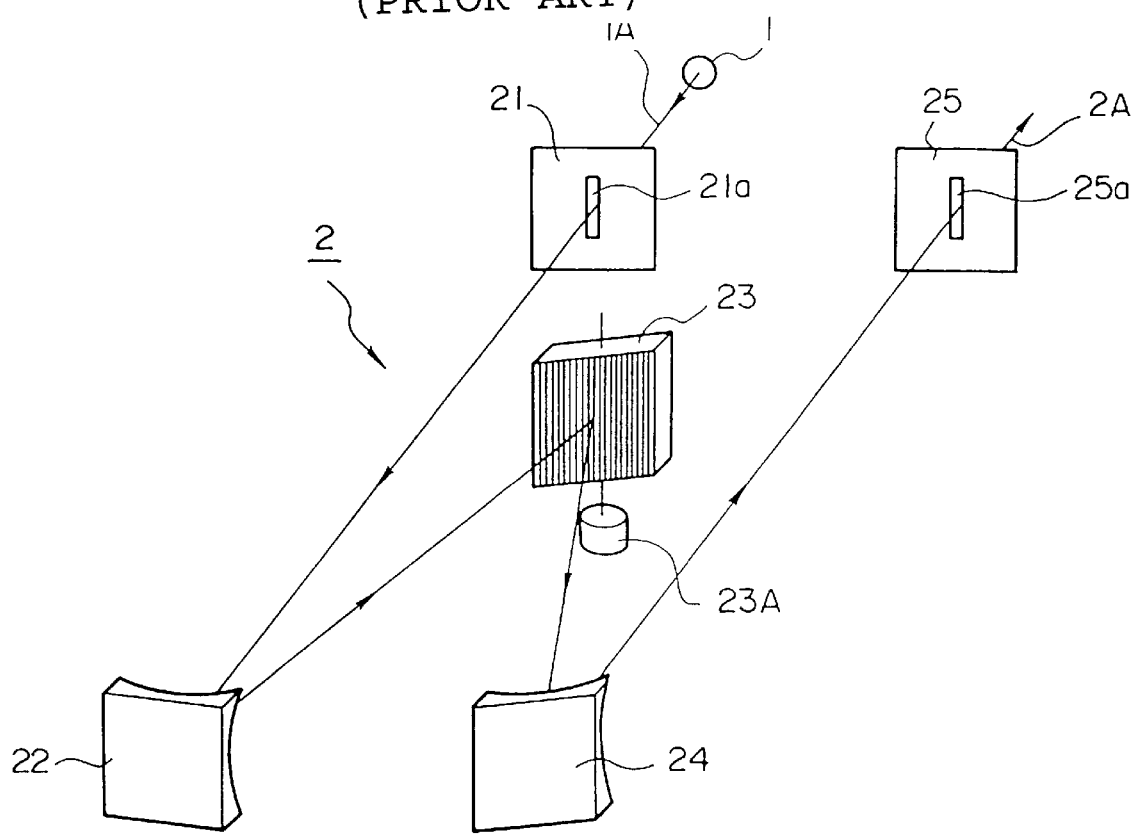
FIG. 5 is a structural diagram showing the detailed structure of the spectroscope shown in FIG. 4.
Figure 6:
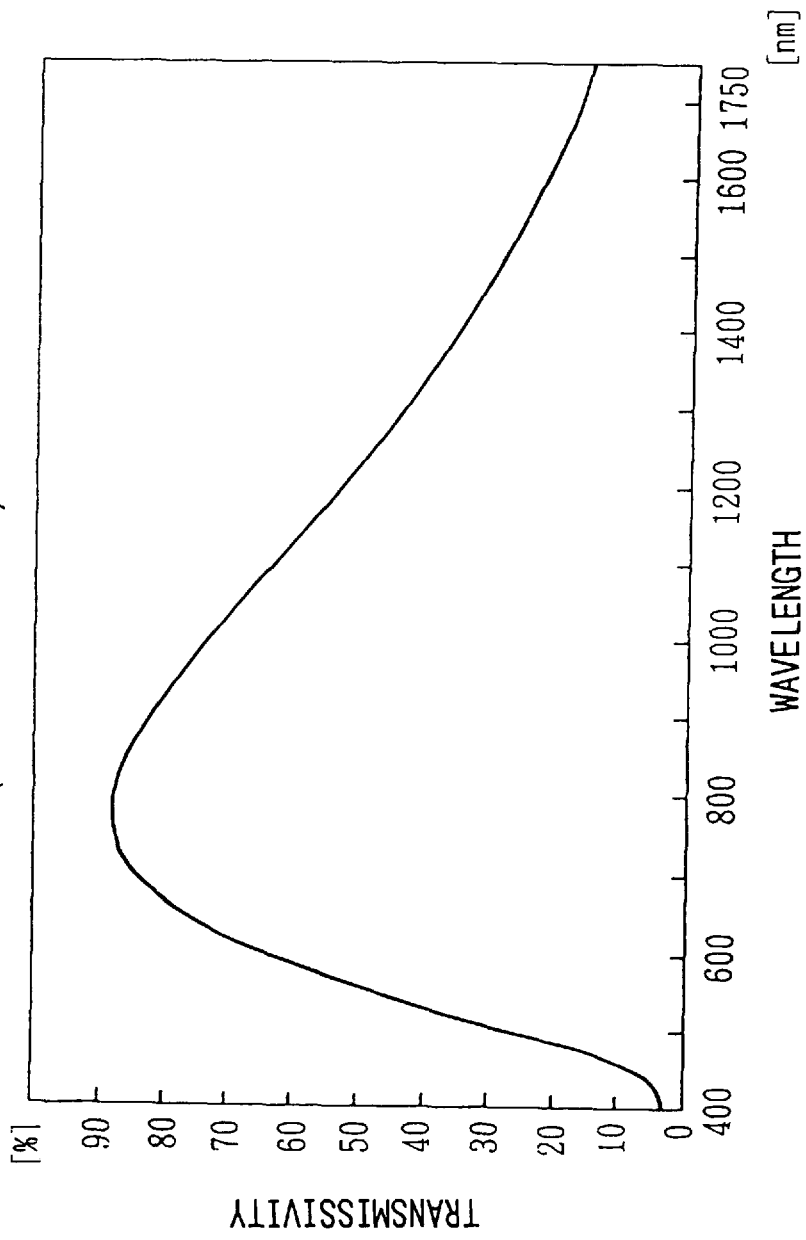
FIG. 6 is a graph showing the wavelength-transmissivity characteristics of the spectroscope shown in FIG. 4.

While the example describes a case wherein a diffraction grating as shown in FIG. 5 is used as the spectroscope, it is also possible to use interference type spectroscopes such as Fabry-Perot resonators. Additionally, it is possible to connect the spectroscope 2 and the optical detector 3 by means of optical fibers instead of connecting them by spatial coupling as described above.

Next, the operation will be explained. First, the output beam from the light source 1 passes through the spectroscope 2, where only specific wavelength components are extracted, and this is received by the optical detector 3 to be converted into an electrical signal. After this electrical signal is amplified by the amplifier circuit 4, it is converted into a digital signal. This process is identical to that of the case explained in connection with FIG. 5.

Additionally, the operations of variably controlling the wavelengths passed by the spectroscope 2 to obtain wavelength-optical intensity characteristics from the optical intensity signal from the A/D converter 5 and controlling the reduction in the optical intensity depending on the passed wavelength by means of the amplification factor of the amplifier circuit 4 is also identical to the case explained for FIG. 5.

In the present invention, the control section 6 is capable of performing inverted bias control of the optical detector 3 by means of the voltage applying means 8.

Next, the differences in the characteristics of the optical detector between the case wherein an inverted bias voltage is applied between the terminals of the optical detector 3 and the case wherein an inverted bias voltage is not applied will be explained with reference to FIG. 3.

Figure 3:
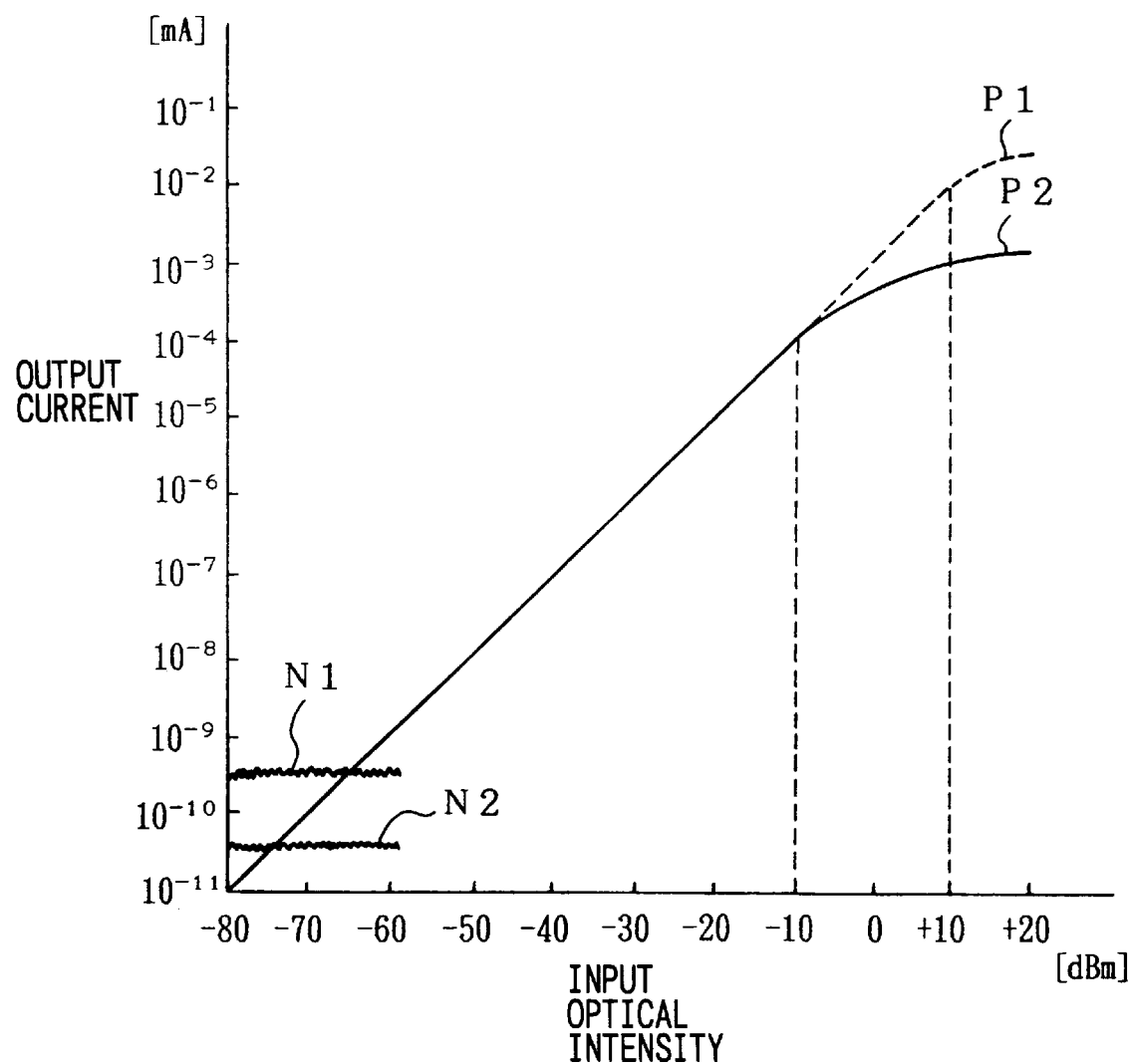
FIG. 3 is a graph showing the input optical intensity-output electrical current characteristics of the optical detector shown in FIG. 1.
Figure 4:
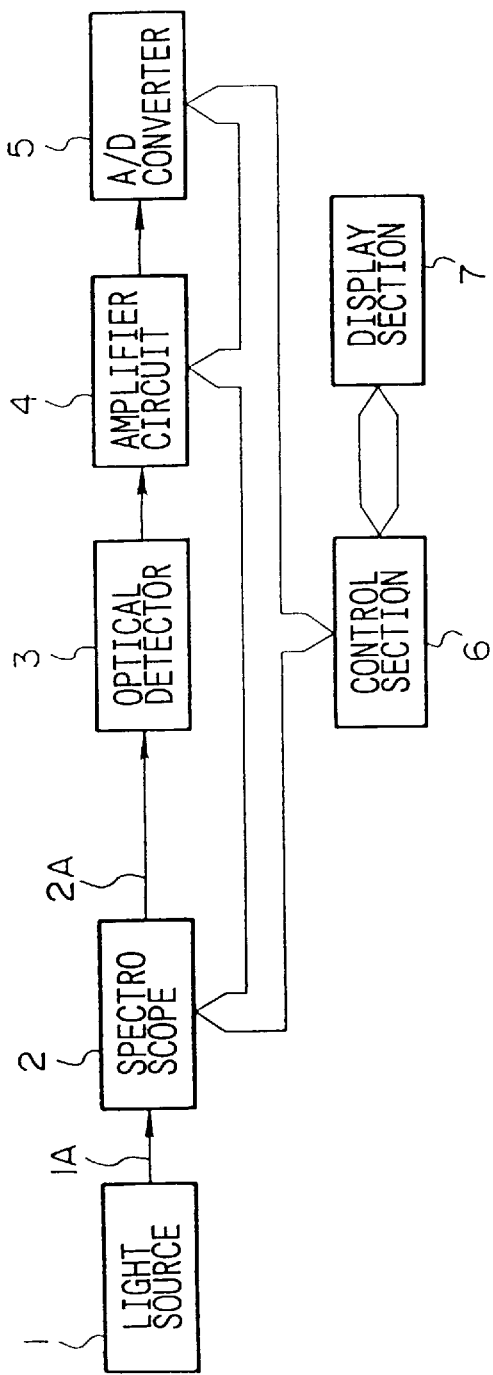
FIG. 4 is a connection diagram showing a conventional optical spectrum measuring device.

In FIG. 3, P1 is a characteristic curve showing the output electrical current with respect to the input optical intensity for the case where an inverted bias voltage is applied to the optical detector 3, and P2 is a characteristic curve showing the output electrical current with respect to the input optical intensity for the case where an inverted bias voltage is not applied to the optical detector 3.

As can be seen from these graphs, applying an inverted bias voltage to the optical detector 3 causes the input optical intensity at which the optical detector 3 begins to saturate to increase from approximately −10 dBm to approximately +10 dBm in comparison to the case wherein an inverted bias voltage is not applied. Consequently, the optical detector 3 can be used up to larger input optical intensities.

Additionally, in FIG. 3, N1 shows the noise for the case where an inverted bias is applied to the optical detector 3, and N2 shows the noise for the case where an inverted bias voltage is not applied to the optical detector 3. When an inverted bias voltage is applied to the optical detector 3, the noise increases and the minimum level for the input optical intensity which is measurable increases in comparison to the case where an inverted bias voltage is not applied.

Next, a first control method whereby the control section 6 controls the voltage applying means 8 for the case where the amplification factor of the amplification circuit 4 is set for each wavelength point will be explained. First, the maximum output electrical current which is usable by the optical detector 3, that is, the maximum non-saturated output electrical current is pre-stored in the control section 6.

Then, upon measurement, the optical intensity detected by the optical detector 3 is measured by means of the output of the A/D converter 5, and it is judged whether or not this is within an acceptable output electrical current range. Additionally, the output electrical current of the optical detector 3 is determined by means of the output value of the A/D converter 5 and the amplification factor of the amplifier 4, and it is determined whether or not this exceeds the above-described maximum output electrical current.

As a result of this determination, the control section 6 orders the voltage applying means 8 to apply an inverted bias voltage between the terminals of the optical detector 3 if the output electrical current of the optical detector 3 does not exceed the maximum output electrical current.

If the voltage applying means 8 is already applying an inverted bias voltage between the terminals of the optical detector 3 and the output electrical current of the optical detector 3 is sufficiently smaller than the maximum output electrical current, then the control section 6 conversely orders the voltage applying means 8 to connect the relay switch 8b to ground so that an inverted bias voltage is not applied between the terminals of the optical detector.

When the output value of the A/D converter 5 is not within a suitable range, then the amplification factor of the amplifier circuit 4 is reset as with the conventional method described above. When control of the inverted bias voltage applied to the optical detector 3 or a change in the amplification factor of the amplifier circuit 4 has been performed, then the optical intensity is once again measured at the A/D converter 5. This procedure is performed over all of the wavelength points.

Consequently, according to this first method, an inverted bias voltage is applied between the terminals of the optical detector 3 only in the cases wherein the output electrical current of the optical detector 3 exceeds the maximum output electrical current which is capable of being used, so as to allow a correct spectrum to be measured without degrading the measurement sensitivity, even when the intensity of the input beam is large.

Next, a second control method whereby the control section 6 controls the voltage applying means 8 for the case wherein the amplification factor of the amplification circuit 4 is held constant will be explained. First, the changes in the transmissivity of the spectroscope 2 over the wavelength range to be measured are found and stored by the control section 6, and if the maximum value of the intensity range to be measured is measured by the optical detector 3, then the wavelength interval in which the output electrical current of the optical detector 3 exceeds the maximum output electrical current in the non-saturated state is determined.

Then, this wavelength interval is made into an interval in which an inverted bias voltage is applied between the terminals of the optical detector 3.

Next, the amplification factor of the amplifier circuit 4 is set with respect to the maximum value of the above-mentioned intensity range to be measured, such that the input voltage to the A/D converter 5 becomes equal to the upper limit of the acceptable range. At this time, separate amplification factors are set inside and outside the above-mentioned wavelength interval.

Upon measuring the spectrum, the rotation of the diffraction grating 23 is stopped before and after the previously determined wavelength interval, and the application of the inverted bias voltage to the optical detector 3 is controlled to be turned on and off. That is, an inverted bias voltage is applied between the terminals of the optical detector 3 only when the above-mentioned wavelength interval which has been previously determined is being measured, and the setting of the amplification factor is changed in according fashion.

That is, in this second method, an inverted bias voltage is applied between the terminals of the optical detector 3 only when measuring within the wavelength range in which there is a possibility that the output electrical current of the optical detector 3 will exceed the maximum output electrical current.

Consequently, the sensitivity is not decreased in the intervals in which the loss in the spectroscope is high and there is no possibility of the output of the optical detector 3 exceeding the maximum output electrical current.

Additionally, the rotation of the diffraction grating 23 is stopped during measurement only before and after the previously determined wavelength interval, so that the increase in the measurement time can be held to a minimum.

I claim:

1. An optical spectrum measuring device, comprising:

a spectroscope for extracting light of specific wavelength components from output beams from a light source;

an optical detector for receiving the light extracted by said spectroscope and converting the light into electrical signals;

an amplifier circuit for amplifying the output signals from said optical detector;

an analog-to-digital converter for converting the output signals from said amplifier circuit into digital signals;

a control section for determining wavelength-optical intensity characteristics from the optical intensities obtained at said analog-to-digital converter, and controlling the amplification factor of said amplifier circuit so as to compensate for decreases in the optical intensities depending on the specific wavelengths which are passed by said spectroscope; and voltage applying means for applying an inverted bias voltage to said optical detector under control of said control section in order to prevent saturation of said optical detector.

2. An optical spectrum measuring device in accordance with claim 1, wherein said control section applies the inverted bias voltage to said optical detector by said voltage applying means when an output value from said optical detector exceeds a pre-stored maximum output value of non-saturation of said optical detector.

3. An optical spectrum measuring device in accordance with claim 1, wherein said control section determines the wavelength range over which the output values of said optical detector exceed a pre-stored maximum output value of non-saturation of said optical detector when the maximum value of the measured optical intensity range has been measured, and applies the inverted bias voltage to said optical detector by said voltage applying means when taking measurements in this wavelength range.

* * * * *